United States Patent [19]

Eng

[11] 4,427,895
[45] Jan. 24, 1984

[54] METHOD AND APPARATUS FOR OPTICAL FIBER COMMUNICATION OPERATING AT GIGABITS PER SECOND

[76] Inventor: Sverre T. Eng, Box 341, S-43900 Onsala, Sweden

[21] Appl. No.: 272,969

[22] Filed: Jun. 12, 1981

[51] Int. Cl.³ .................................................. H04B 9/00
[52] U.S. Cl. .................................... 250/551; 455/610; 370/4
[58] Field of Search ................................... 250/551, 227; 455/609-612; 370/4; 350/96.15, 96.16

[56] References Cited

U.S. PATENT DOCUMENTS 3,633,034 1/1972 Uchida et al. ................... 455/610 X
4,302,835 11/1981 McMahon ................................ 370/4

OTHER PUBLICATIONS

Tell et al.; "8 Gbit/s Optical Transmission with T.J.S. GaAlAs Laser and p-i-n Detection"; Electronic Letters; Jun. 19, 1980; vol. 16, No. 13; pp. 497-498.
Picosecond Pulse-Code Modulation Scheme for Injection Lasers—3rd Intl. Conference on Integrated Optics and Optical Fiber Communication Apr. 27-29, 1981, OSA/IEEE, San Francisco, CA.
Wideband Frequency Modulation with Reduced Resonancelike Peak in TJS Lasers—3rd Intl. Conference on Integrated Optics and Optical Fiber Communication Apr. 27-29, 1981, OSA/IEEE San Francisco, CA.
Simple Picosecond Pulse Generation Scheme for Injection Lasers—Electronics Letters, vol. 16, No. 15, Jul. 17, 1980, pp. 600-602.

Primary Examiner—David C. Nelms
Assistant Examiner—Edward P. Westin
Attorney, Agent, or Firm—Freilich, Hornbaker, Rosen & Fernandez

[57] ABSTRACT

Optical fiber communication at 3 to 8 Gbit/s utilizes a step recovery diode (SRD 16) to provide a narrow pulse (100 ps) with a long pulse period (10 ns). A power divider (20) multiplexes the narrow pulse through channel switches (1, 2, 3) and a fourth channel to the diode detector (14) of the receiver. The switches are used for binary code modulation of the multiplexed narrow pulses, which are staggered in time by delay lines (24), and combined into a train of equally spaced and modulated pulses by an OR gate (26). A laser driver (22) responds to the train to drive a damped relaxation oscillation peak, single-mode and reduced spontaneous emission lifetime semiconductor laser biased 10-20% above threshold current (10). At the receiver, detected optical pulses are demultiplexed by a delay line (30) and AND gates (32) which are synchronized by clock pulses from a source (18) which drive the SRD. Each clock pulse is delayed a sufficient time to align it with a group of demultiplexed pulses.

9 Claims, 6 Drawing Figures

Δ = FRONT END DELAY

METHOD AND APPARATUS FOR OPTICAL FIBER COMMUNICATION OPERATING AT GIGABITS PER SECOND

BACKGROUND OF THE INVENTION

This invention relates to a method and apparatus for optical fiber communications, and more particularly to digital communications over optical fibers at high data rates in the high gigabit range, e.g., five to eight gigabits per second.

Many ambitious wideband optical fiber communication projects with interactive services are presently under development throughout the world. The wide bandwidth is especially needed for high-resolution video transmission and distribution. In addition, microprocessor-based instrumentation and equipment numbering in the thousands, and spaced miles apart, may have a need to communicate with each other. This electronic trend will lead to automated factories and offices. Other high-data-rate systems will be associated with earth resource satellites and their new sophisticated high-data-rate sensors, e.g., synthetic aperture radar and imagers. In order to support this information explosion, gigabit per second optical fiber networks have to be constructed.

Optical fiber communication experiments in the 1 to 2 Gbit/s range have been performed in several laboratories using low-loss single-mode fibers. The major limitations have been in the modulation characteristics of the semiconductor lasers, which have been limited by turn-on delay, relaxation oscillations, and interpulse interference. The problem has been to utilize the large optical bandwidth of semiconductor lasers. Picosecond pulse generation, combined with optical multiplexing, is one method that may be utilized. Mode-locking techniques using a c.w. GaAlAs laser diode have reportedly produced very narrow pulses. Picosecond optical pulse generation from an r.f. modulated AlGaAs diode laser has also been reported. In this invention damped relaxation oscillation, single-mode semiconductor lasers biased 10-20% above threshold current have been used to increase the modulation bandwidth.

SUMMARY OF THE INVENTION

In accordance with the present invention, a single-mode optical fiber transmission system is capable of transmitting digital signals in the Gbit/s range. The system is comprised of a semiconductor laser driven by a narrow (100 picosecond) pulse generator with a long (10 nanosecond) pulse period multiplexed to N delay lines of varying lengths, where data modulation is effected by selectively switching into the delay lines for sequential pulse transmission. The time spaced output pulses of the delay lines are combined on a common line to present to a laser driver a train of modulated N pulses following each narrow pulse. The pulse driver modulates the laser, and a single-mode optical fiber, having its butt end against the laser, carries the optical output pulses to a receiver. At the receiver, the optical pulses are detected by a semiconductor detector and amplified. The amplified pulses are then demodulated using a delay line having AND gates connected at intervals commensurate with the differences in lengths of the delay lines in the transmitter, i.e., at intervals corresponding to the inverted bit rate. The AND gates are designed to operate at a high switching rate commensurate with the clock pulse rate from the narrow pulse generator driving the multiplexer in the transmitter. Suitable means at the transmitter divide the output of the narrow pulse generator into the gated delay lines of the multiplexer and also into a separate channel for the clock to the receiver. The outputs of the clocked AND gates at the receiver thus present the data modulated at the transmitter in the form of N parallel bit pulses for every clock pulse.

The novel features that are considered characteristic of this invention are set forth with particularity in the appended claims. The invention will best be understood from the following description when read in connection with the accompanying drawings.

DESCRIPTION OF PREFERRED EMBODIMENTS

DESCRIPTION OF PREFERRED EMBODIMENTS

For the preferred embodiments of the invention described below, two lasers available for gigabit operation are a buried heterostructure (BH) laser and a transverse junction stripe (TJS) laser. The TJS laser available from Mitsubishi (ML-2307 79-022) operates in a single mode during pulse modulation even when the bias current is 5 to 20 percent above threshold. The BH laser available presently from Hitachi shows multimode behavior. The optical pulse of a BH laser is broadened in a 500 meter single-mode optical fiber operating in the 0.85-$\mu$m wavelength region, while the optical pulse of a TJS laser shows no dispersion. The maximum bit rate that can be achieved with a BH laser is thus less (about 3 Gbit/s) than with a TJS laser (about 8 Gbit/s). These lasers, which have high data rate modulation potential, have generally two-dimensional waveguiding and optical confinements to a small region with a few micron lateral width. This enhances the carrier diffusion, gain saturation, single-mode operation, and spontaneous emission damping of relaxation oscillations. These properties make, in particular, the TJS laser have a reduced relaxation oscillation peak and a short spontaneous lifetime. By biasing the diode as high as 10 to 20 percent above threshold current, a wide modulation bandwidth is obtained.

Figure 1:
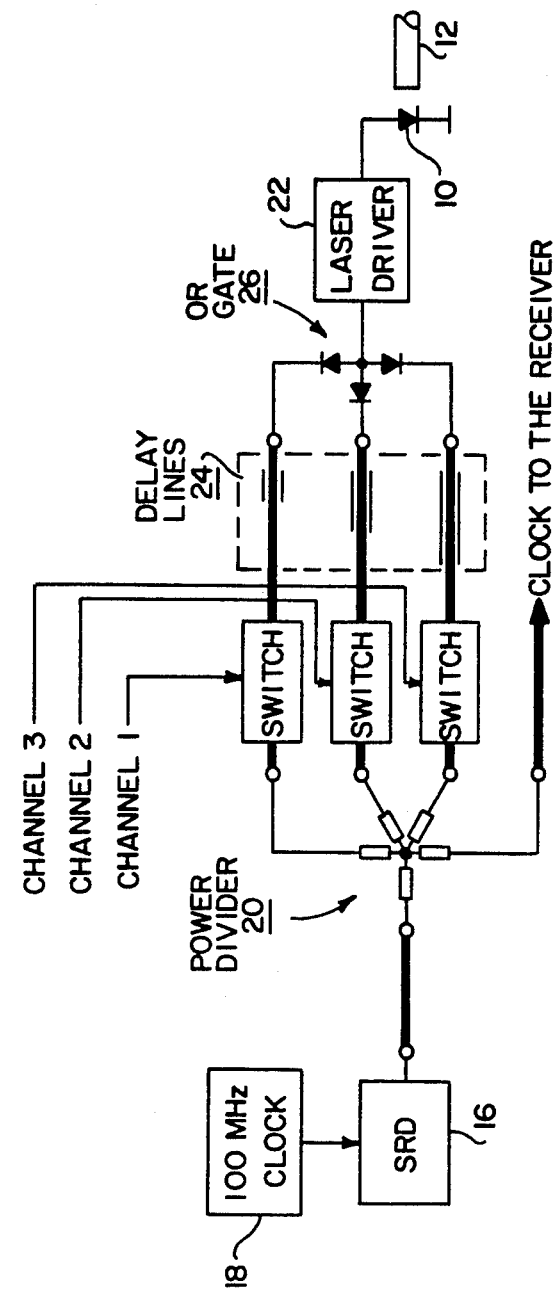
FIG. 1 is a block diagram illustrating the organization of a transmitter in an optical fiber communication system operating at gigabits per second according to the present invention.
Figure 2:
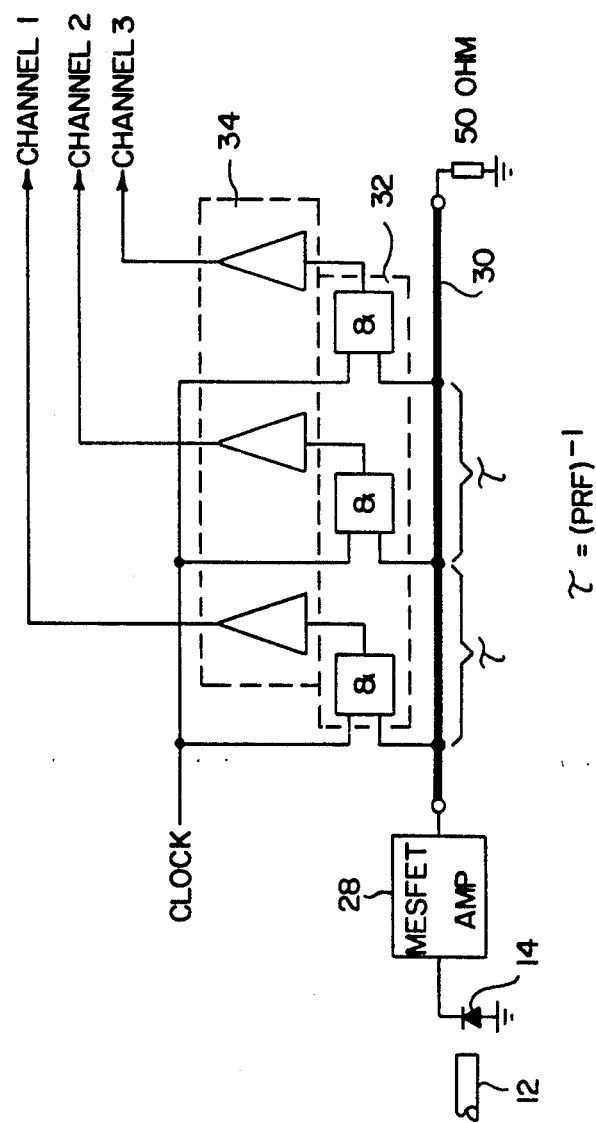
FIG. 2 is a block diagram illustrating the organization of a receiver in an optical fiber communication system operating at gigabits per second according to the present invention.

Referring now to FIGS. 1 and 2, an exemplary optical fiber communication system operating at gigabits per second utilizes a pulsed laser 10 at a transmitter shown in FIG. 1, a 500 m single-mode optical fiber 12 coupling the transmitter to a receiver shown in FIG. 2, and a photodiode 14, such as a Philco-Ford L4501 p-i-n diode or an avalanche photodiode (Telefunken BPW- 28) at the receiver in FIG. 2. The laser 10 is pulsed at a gigabit rate by a word generator comprised of a step recovery diode (SRD) 16 which delivers 100 picosecond wide pulses at 10 nanosecond intervals in response to a 100 MHz clock from a source 18. Each of the SRD pulses is divided into a number, N, of signal lines by a power divider 20 comprised of resistors connected to a node. One resistor couples the node to a signal line which carries the SRD pulses to the receiver for use as clock pulses in a demultiplexing operation to be described with reference to FIG. 2. Other resistors connected to the node couple the SRD pulses into a plurality of channel switches (or AND gates) 1, 2, 3 . . . N. For simplicity, only three are shown, although as many as 70 could be accommodated for nonreturn to zero (NRZ) modulation within the 10 ns pulse period of the SRD pulses.

The channel switches are coupled to a laser driver 22 by delay lines 24 through an OR gate (buffer diodes) 26. The propagation time in the delay lines is varied to separate the SRD pulses from the channel switches 1, 2, 3 . . . N by an interval selected between some minimum and some maximum. The maximum is determined by the number of channels to be time staggered in the 10 ns period of the SRD pulses. The minimum is established by the narrowness of the laser pulses as propagated through the optical fiber 12, typically 0.4 ns.

The channel switches may be selectively disabled to generate a binary word. Consider, for example, that only the channel 2 switch is disabled during one clock period of the source 18 for three channels. An SRD pulse divided into the three channels will pass through only channels 1 and 3 for transmission of a binary word 101. The AND gate circuit shown in FIG. 5 may be used for each of these circuits.

Each binary word to be transmitted may be stored in a register having one stage for each channel switch to electronically disable the switches 1, 2, 3 . . . N according to successive binary digits stored, and the word stored may be changed in response to each successive clock pulse from the source 18. The rate of the bits transmitted over the optical fiber 12 is thus N times the clock rate, where N is the number of bit intervals into which a clock period is divided. This rate is in the gigabit range, typically between 3 Gbits and 8 Gbits, depending upon the characteristics of the laser selected and the detector used.

At the receiver, the photodiode 14 converts the optical bit pulses to electrical pulses, and an MESFET low-noise amplifier 28 couples the electrical pulses into a 50-ohm tapped delay line 30 terminated by its characteristic impedance. In the case of a Philco-Ford L4501 p-i-n detector, the MESFET amplifier is designed to load the detector with 11 ohms, which, together with the 1.5 pF junction capacitance of the diode, yields an RC bandwidth of about 9 GHz. The p-i-n transit time bandwidth is 15 GHz. With microstripline mounting of the p-i-n detector, the combined bandwidth has been measured to be 5.5 GHz. This give an overall bit rate capability of the receiver of approximately 5.5 Gbit/s with return to zero (RZ) coding and 11 Gbit/s with nonreturn to zero (NRZ) coding, so the bandwidth limitation of the system is only in the rate at which laser pulses can be transmitted over the optical fiber if a p-i-n detector is used. In the case of avalanche photodetection with gain, the receiver was limited to 5 Gbit/s. The laser diode bias current was 10% above threshold. For an 8 Gbit/s system, the laser diode bias current should be 20% above threshold.

Optical transmission of laser pulses over the optical fiber at 8 Gbit/s has been obtained with a TJS laser and a p-i-n detector, and at 3 Gbit/s with a BH and at 5 Gbit/s with a TJS laser and avalanche photodetector. In all cases a 500 meter single mode fiber was used. Bit error rates of $10^{-9}$ have been measured to prove the feasibility of the system at 5 Gbit/s.

Demultiplexing the serially transmitted bits of the channels is done through a group of AND gates 32 connected to taps on the delay line 30 with a spacing selected to match the intervals between the delay lines of the transmitter chanels, i.e., with a spacing selected to present in parallel the serially transmitted bit pulses. The SRD pulse transmitted through the separate channel from the transmitter to the receiver as a clock pulse is aligned in time with the bit pulses at the delay line taps using an adjustable delay element (not shown) so that the aligned clock pulse will enable the AND gates to present at the outputs of the AND gates the same binary word as used to modulate the channels at the transmitter. This is illustrated in FIGS. 3 and 4 for the transmission of a three-bit word 101.

Figure 3:
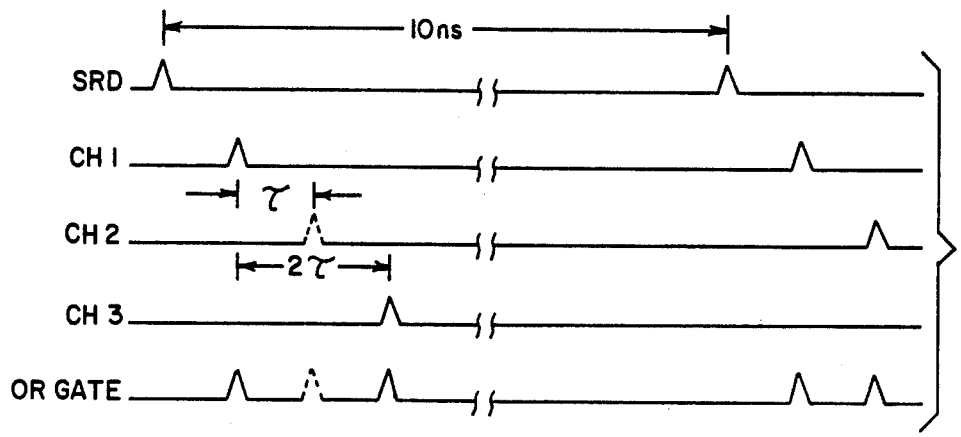
FIG. 3 is a timing diagram useful in understanding the multiplexing function of the transmitter.

In FIG. 3, the SRD pulse is delsyed some interval which may approach zero for channel 1, and selected intervals $\tau$ and $2\tau$ for channels 2 and 3 in order to separate the SRD pulse into three pulses separated in time by an interval $\tau$. The pulse for channel 2 is shown in dotted lines because it is inhibited by the binary word 101 in the example. These separated SRD pulses are then combined by the OR gate 26 to present to the laser 10 a train of three pulses. These pulses drive the laser to produce on the optical fiber a train of binary coded optical pulses.

Figure 4:
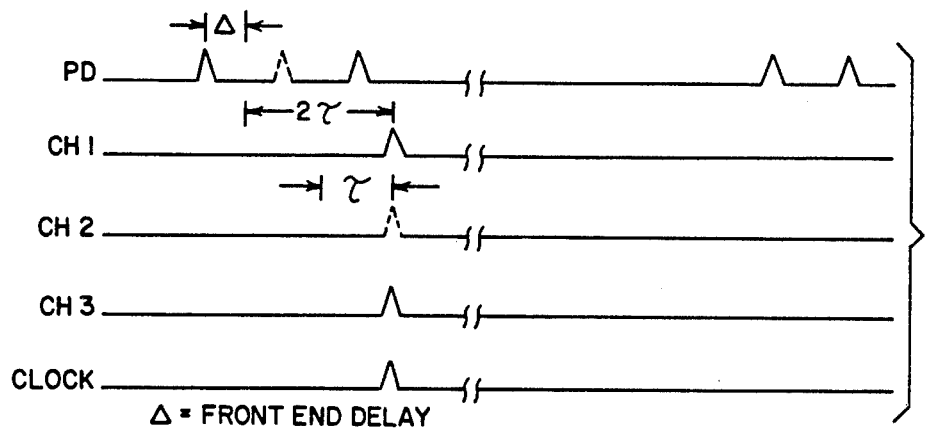
FIG. 4 is a timing diagram useful in understanding the demultiplexing function of the receiver.

FIG. 4 shows the serial optical pulses as detected by the photodiode 14, and distributed to the AND gates. Since the pulse from channel 1 is received first, it is gated through the AND gate connected to the delay line 30 having the longest delay. AND gates for channels 2 and 3 are then spaced from the AND gate for channel 1 by intervals of $\tau$ and $2\tau$, thus aligning the three channel pulses at the inputs to the AND gates. Again the inhibited pulse for channel 2 is shown in dotted lines. If the clock is also aligned with the channel pulses, the binary word modulated by the transmitter is recovered at the outputs of the AND gates and amplified by a group of amplifiers 34.

Figure 5:
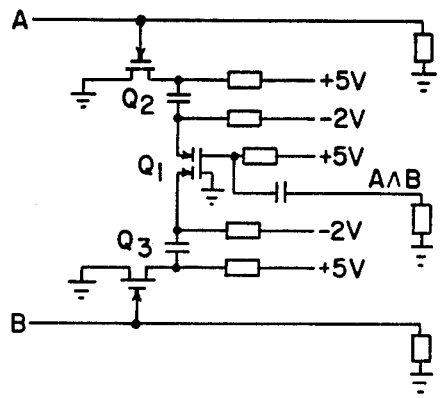
FIG. 5 is a circuit diagram of a high speed AND gate used in the receiver of FIG. 2.
Figure 6:
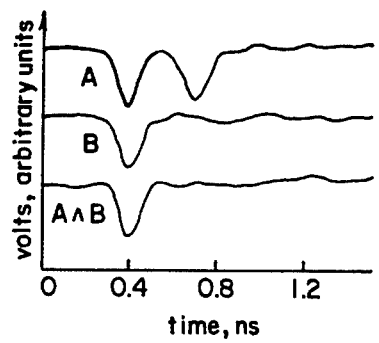
FIG. 6 illustrates waveforms that show the performance of the AND gate shown in FIG. 5.

FIG. 5 shows a circuit diagram for the AND gates, and FIG. 6 shows the performance of the AND gates at a bit rate of 10 Gbit/s NRZ. Assuming that the waveform B is the clock pulse waveform, and that the waveform A is the detector output, when the clock is aligned with a pulse from the detector, and both are applied to an AND gate, the output of the AND gate shown in the third waveform is the function $A \cap B$. This waveform presents a well defined binary pulse.

The optical communications system thus implemented for operation at higher bit rates requires a fast digital AND gate. A suitable two-port AND gate capable of operating at 10 Gbit/s is shown in the circuit diagram of FIG. 5. It utilizes for transistor $Q_1$ a commercial dual-gate GaAs MESFET manufactured by Plessey. Inverting transistors $Q_2$ and $Q_3$, which are also GaAs MESFETs, couple the outputs A and B to the gates of the dual-gate MESFET. The dual-gate MESFET conducts as long as at least one of its gates is at 0 V. When positive pulses are present simultaneously at both gates, the dual-gate MESFET will conduct, and a negative pulse corresponding to a bit 1 will appear at the output. The input pulses, initially created by the step recovery diode (SRD) 16 are negative, with 0 V representing a bit 0, and −2 V representing a bit 1.

The high input impedance of the transistors $Q_2$ and $Q_3$ makes it possible to connect them to signal lines without affecting the signals significantly. A 100 ps wide pulse will drop about 1% in amplitude in passing a MESFET gate. This low loss is very important in demultiplexing applications, where many gates are connected on a tapped delay line, such as a microstrip line. It is estimated that the maximum bit rate of this gate circuit would be approximately 50 Gbit/s NRZ. The present invention is thus not limited by the demultiplexing AND gates. As noted hereinbefore, this gate circuit may also be used for the multiplexing switches in the transmitter, but since the multiplexing switches need operate at only the clock rate 100 MHz, other techniques may be used to implement those switches.

It is thus evident that, in accordance with the present invention, a single-mode optical fiber transmission system is capable of transmitting data at a rate ranging from about 3 to 8 Gbit/s using a narrow pulse generator multiplexed to N channels of switches and delay lines of varying lengths to transmit a modulated train of N pulses during each narrow pulse interval. This train of N pulses may then drive a laser to transmit optical pulses over the optical fiber. At the receiver the pulses are demultiplexed to present each group of N pulses in parallel.

There is another way of modulating the laser or generating sharp pulses other than the damped relaxation oscillation method with TJS lasers, as described above, and that is making use of the relaxation oscillation phenomena occurring in inexpensive laser diodes, such as LCW-10 broad-stripe lasers from Laser Laboratories Inc. modulated by 100 ps or 300 ps pulses generated from a step recovery diode, as described by P. Torphammar, S.T. Eng, "Picosecond Pulse Generation in Semiconductor Lasers Using Resonance Oscillation," *Electronics Letters*, vol 16, July 1980, 587–589. Picosecond pulse generation, by using the method of resonance oscillation of semiconductor diodes, is probably not as effective for single-mode systems operating in the 5–8 Gbit/s range. However, the method should be very useful for multimode fiber-optic transmission systems around 2–3 Gbit/s and in many applications such as photodetector bandwidth characterization, dispersion measurements in gigabit fibers and in general instrumentation and control applications. The LCW-10 laser diodes used are very inexpensive and readily available.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A method for optical fiber communication operating at gigabits per second comprising the steps of
   generating periodic narrow pulses at a rate below said gigabit per second rate of communication by some multiple equal to or greater than N, where N is a selected integer,
   dividing said narrow pulses into N channels, each of the channels 1 through N delaying the narrow pulse through it by an interval, $\tau$, greater than the channel preceding it in the sequence 1 through N, and at each of the channels selectively inhibiting the narrow pulse according to the value of a respective binary digit in a group of N binary digits,
   combining the delayed narrow pulses of said channels into a group of serial pulses in one channel,
   driving a damped relaxation oscillation semiconductor laser with a bias current 10 to 20 percent above threshold laser current with said group of serial pulses to produce a train of optical pulses for transmission,
   transmitting said train of optical pulses over an optical fiber to a receiver, and
   detecting said train of optical pulses at said receiver.

2. A method as defined in claim 1 including the step of distributing said train of detected pulses to N output terminals, thereby recovering said group of N binary digits.

3. A method as defined in claim 2 wherein said periodic narrow pulses are generated in response to low frequency clock pulses, and each narrow pulse is transmitted over a separate channel to said receiver for synchronization of the step of distributing said train of detected pulses, whereby one group of N binary digits are transmitted between the transmitter and receiver for every low frequency clock pulse.

4. Apparatus for communication of binary coded data between a transmitter and a receiver, where said data is to be transmitted serially in groups of N digits over a single optical fiber at a gigabit rate, one group of N digits for every clock pulse of a low frequency source comprising
   means for generating a narrow pulse in response to each clock pulse from said low frequency clock pulse source,
   means for dividing each narrow pulse into N channels, said channels being assigned to respective digits of said group, each channel including
      means for inhibiting or not inhibiting said narrow pulse in accordance with the value of its assigned binary digit, and
      means for delaying said narrow pulse an interval,, from a channel responding to a preceding binary digit of said group,
   means for combining pulses from said channels into one train of binary coded pulses,
   means responsive to said train of binary coded pulses for generating a train of optical pulses in response thereto,
   means for detecting said train of optical pulses,
   an optical fiber coupling said train of optical pulses from said optical pulse generating means to said detecting means, and
   means responsive to said detecting means for recovering from detected optical pulses said train of binary coded pulses.

5. Apparatus as defined in claim 4 wherein said means for generating said narrow pulses is comprised of a step recovery diode.

6. Apparatus as defined in claim 4 or 5 wherein said optical pulse generating means is a semiconductor laser operating in a single longitudinal mode.

7. Apparatus as defined in claim 6 wherein said optical fiber is a single-mode optical fiber.

8. Apparatus as defined in claim 7 wherein said detecting means is a p-i-n diode or an avalanche photodiode.

9. Apparatus as defined in claim 8 wherein said means for recovering said train of binary coded pulses is comprised of a delay line with taps spaced with a delay time from one to the next of said interval, $\tau$, and an AND gate connected to each tap, each AND gate being enabled by a clock pulse from said clock pulse generating means when said train of binary coded pulses is aligned on said delay line, said clock pulses from said generating means being transmitted over a separate line with a delay sufficient for synchronizing action with alignment of said train of binary coded pulses with said taps.

* * * * *